INVENTOR.
WILLARD W. RICE, JR.
BY David E. Hoppe
ATTORNEY

INVENTOR.
WILLARD W. RICE, JR.
BY David E. Hoppe
ATTORNEY

United States Patent Office 3,448,393

Patented June 3, 1969

3,448,393
MEANS FOR ERROR CORRECTION

Willard W. Rice, Jr., Foxboro, Mass., assignor to The Foxboro Company, Foxboro, Mass., a corporation of Massachusetts Filed July 27, 1965, Ser. No. 475,060
Int. Cl. H03f *1/34*
U.S. Cl. 330—9 3 Claims This invention relates to means for automatic compensation of a system error and more particularly to devices for automatically compensating for a shift in reference level of an input signal.

In chromatography applications, the reference level of the output signals from the columns may vary in some cases by as much as 50% of the output peak amplitudes when switching columns. It is necessary to effectively restore the reference levels from all columns to a selected value in order for correct interpretation of column output peak amplitudes. Heretofore, one method of restoration of reference levels has been accomplished in the art by means of mechanical servos operating on the output of a chromatography signal amplifier. The servo periodically detects an error and compensates the input level accordingly. A disadvantage of the servo method is its relatively slow-acting means, which is not often responsive sufficiently to completely compensate for severe changes in reference levels between successive selected columns. As another method, the art also employs additional amplifiers, to accomplish reference adjustments with the consequent increased cost and complexity required by the addition of a large number of components.

The present invention accomplishes zero correction with a circuit simplification over these zero-correctors of the prior art.

Accordingly it is an object of this invention to provide a means for compensating the reference level at the input of a chromatography operational amplifier, such means being simple, inexpensive, easy to adjust and accurate.

It is another object of this invention to provide a means for automatically zeroing the input of an operational amplifier at such times as it may be required.

It is another object of this invention to provide an automatic reference readjustment means for an operational amplifier which may be operated at preselected times to insure error correction at desired operating times and intervals.

It is another object of this invention to provide an automatic zeroing device for an operational amplifier having few components and being simple and inexpensive.

It is another object of this invention to provide an extremely sensitive reference correction device for the input to an operational amplifier capable of completely compensating for any shift in the reference of a signal input thereto.

It is another object of this invention to provide a simple and inexpensive method for rezeroing the input to an amplifier prior to a specified operating interval.

Further objects and advantages of this invention will be apparent from the following detailed description thereof together with the figures therewith in which.

Figure 1:
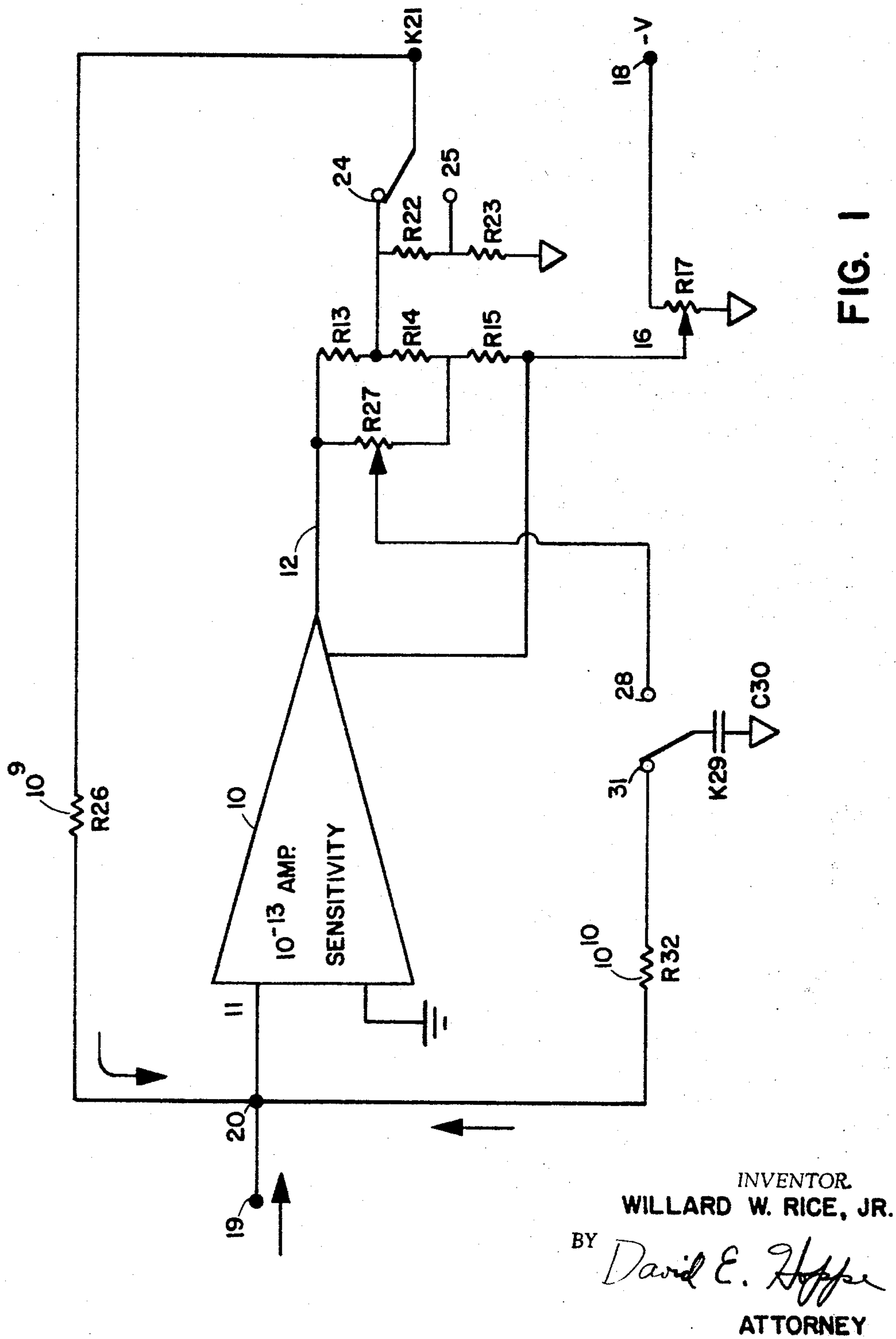
FIGURE 1 is a schematic of an embodiment of the invention.

Operational amplifier 10 has input 11 having a very high sensitivity, illustratively $10^{-13}$ amperes for full output at output 12. Such output may illustratively be from zero to 12 volts at full output. The output of operational amplifier 10 is taken from output 12 and dropped across resistors R13, R14, R15 in series to a reference point 16 at the arm of potentiometer R17. R17 is supplied with a negative D.C. potential from point 18. The purpose of this reference is to provide an adjustment so that the junction of R13 and R14 may be referenced to zero potential at a no-signal-in condition to operational amplifier 10.

At the times a reference level is supplied from terminal 19 to summing point 20 at the input 11 of operational amplifier 10, relay K21 selects a portion of the operational amplifier output 12 dropped across R22 and R23. The level at the junction of R22 and R23 is illustratively one tenth of the level at terminal 24. Should the reference level be deviated from zero, an output of operational amplifier 10 at 12 and subsequently terminals 24 and 25 will be an amplified result of that deviation. The portion selected at terminal 25 by relay K21 is supplied back through R26 which is illustratively $10^9$ ohms, in the form of negative feedback to summing point 20. This selection of illustratively one tenth of the output 12 by relay K21 for furnishing the negative feedback for operational amplifier 10 effectively raises the sensitivity of operational amplifier 10 by a factor of ten times while K21 is in the position of contacting terminal 25.

At the same time the reference level is sampled, a tap on potentiometer R27 is connected to terminal 28 of relay K29 to charge up capacitor C30 which is illustratively 10 microfarads of a non-electrolytic low-leakage type such as Mylar. Potentiometer R17 is adjusted to select a zero level for a no-input condition to amplifier 10. For an input condition, to the extent that the reference level from terminal 19 deviates from zero, there will be an amplified output of the operational amplifier which charges capacitor C30 through position 28 of the relay K29. This charge is ten times the charge which the reference level would determine at output 12 were the amplifier operating with full negative feedback.

The time constants in the charging path of C30 are such that the capacitor C30 charges up very quickly.

At such operating times as it is required for the operational amplifier 10 to process input signals from terminal 19, relays K21 and K29 are switched to contact terminal 24 and terminal 31 respectively, the positions illustrated in FIGURE 1, thereby setting up the amplifier 10 for normal operation. Zero correction is provided by capacitor C30 through terminal 31 and through resistor R32 which is illustratively $10^{10}$ ohms, to summing point 20 of operational amplifier 10. The negative feedback selected by K21 is now the full output from the operational amplifier, thus restricting the amplification of that amplifier to one tenth the previous value while capacitor C30 was being charged. Capacitor 30 contains a charge representing a value of zero offset 10 times that which would be obtained under normal operational conditions. Therefore, resistor R32 is larger than negative feedback resistor R26 by a factor of ten so that the resultant potential at summing input 20 will be of equal orders and thereby cancel. R27 compensates for any difference between the feedback ratio controller by K21 and the R26/R32 ratio by fine-trimming the charging potential applied to C30. It is desirable that R32 be $10^{10}$ ohms so that a large time constant is obtained. Capacitor C30 now provides back to the summing point 20, an equal and substitution current for that provided by the negative feedback path. Thereby the current from C30 itself is sufficient to eliminate the error at the output of amplifier 10 caused by any zero reference shift. The output 12 thus goes to zero and the negative feedback through R26 is also reduced to zero.

The total of the three sums at summing point 20 will be zero. R32 must be of the order of $10^{10}$ ohms in order for the time constant of C30–R32 to be large enough so that no significant change in reference correction occurs during the interval selected for signal amplification. A 1% leakage from C30, for example, will result in a 1% loss in the accuracy of the reference correction.

The source impedance with the arrangement must be high, in the order of $10^{12}$ ohms, else the feedback loops are loaded down and their effects nullified.

Figure 2:
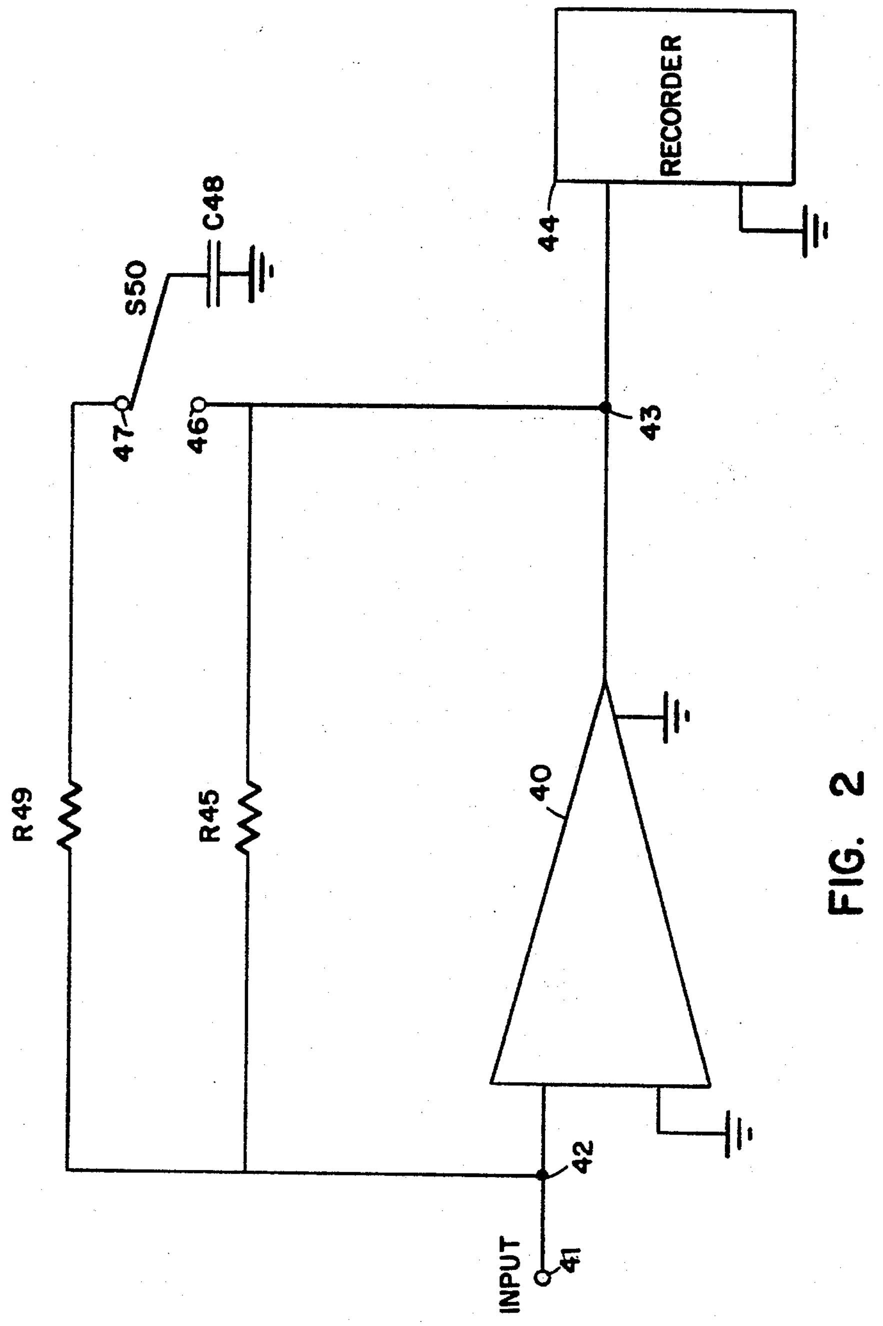
FIGURE 2 is a schematic of an alternative simplified embodiment of the invention.

Referring now to FIGURE 2, an alternative and simplified embodiment of the invention is shown. Operational amplifier 40 has input terminals 41 connected to summing point 42. Output 43 of amplifier 40 is connected to an output device 44, such as a recorder, as well as to feedback resistor R45 and terminal 46 of switch S50. At times prior to a signal input, the reference is sampled by switching S50 to terminal 46 thus charging C48 up to the level of the output at 43 of operational amplifier 40. If there is any shift in reference level input at terminal 41 the output at 43 is similarly shifted from zero multiplied by the sensitivity of amplifier 40. The sensitivity of amplifier 40 is determined by negative feedback resistor R45 connected between output point 43 and input 41 of amplifier 40.

At the time to process a signal, switch S50 connects C48 to terminal 47 and thereby connects C48 through R49 to summing point 42. Resistor R49 is the same ohmic value as negative feedback resistor R45. Thus, capacitor C48 is providing through resistor R49 to summing point 42 exactly the same amount of negative feedback required by amplifier 40 in the reference-level sampling mode of operation. The output at 43 of amplifier 40 resulting from the reference level at summing point 42 now drops to zero as negative feedback through R45 is no longer required for balanced operation.

What is claimed is:

1. An input reference level compensation device comprising: an amplifier having an input terminal and an output terminal, negative feedback means having a signal supplied from said output terminal through a first impedance to said input terminal, means for storing a level having a predetermined ratio to the level at said output terminal at a predetermined time, means for periodically isolating said means for storing from operative interconnection with said output terminal and placing said means for storing in operative interconnection with said input terminal through a second impedance having a ratio to said first impedance equivalent to said aforementioned ratio for providing reference compensation.

2. An input level error correction system comprising:
- an amplifier,
- an input terminal to said amplifier,
- an output terminal from said amplifier,
- means for sequentially connecting two levels of negative feedback from said output terminal through a first impedance to said input terminal at first and second predetermined times respectively said levels having a predetermined ratio therebetween,
- means for storing the level at said output terminal at said first predetermined time,
- means for isolating said means for storing from said output terminal and placing said means for storing in operative interconnection with said input terminal through a second impedance at a second predetermined time said second impedance having a ratio to said first impedance substantially equivalent to said ratio between said levels.

3. An input reference level error correction system comprising:
- an amplifier having an operating mode and a reference sampling mode,
- an input terminal to said amplifier,
- an output terminal to said amplifier,
- a capacitor having one end periodically supplied by said output terminal for storing the level therefrom at sampling times, negative feedback impedance connected to said input terminal supplied by said level at said output terminal at operating times and supplied by a predetermined proportion of said level at sampling times,
- means for supplying the level from said one end of said capacitor through a second impedance to said input terminal at operating times said second impedance being proportionally higher to said negative feedback impedance in a like ratio to the ratio between said level and said predetermined proportion of said level.

References Cited

UNITED STATES PATENTS

| | | | |
|---|---|---|---|
| 2,936,423 | 5/1960 | Berry | 330—9 |
| 2,970,266 | 1/1961 | Molloy et al. | 330—9 X |
| 3,050,673 | 8/1962 | Widmer | 307—255 |

NATHAN KAUFMAN, *Primary Examiner.*

U.S. Cl. X.R.

330—51